United States Patent Office 3,582,307
Patented June 1, 1971

3,582,307
METHOD OF REMOVING WATER FROM MELTS OF INORGANIC GLASS
Hans-Otto Mulfinger, Mainz-Mombach, Germany, and Helmut Franz, Oakmont, Pa., assignors to Max-Planck-Institut fur Silikatforschung, Wurzburg, Germany
No Drawing. Continuation-in-part of application Ser. No. 603,433, Dec. 21, 1966. This application Jan. 19, 1970, Ser. No. 4,045
Claims priority, application Germany, Dec. 24, 1965, M 67,797
Int. Cl. C03b 5/16
U.S. Cl. 65—134        3 Claims

ABSTRACT OF THE DISCLOSURE

Water is removed from a melt of inorganic glass by introducing into the glass melt molecular nitrogen with a nitrogen-free reducing agent, such as carbon or carbon monoxide which with the glass-forming elements carrying oxygen and hydroxyl groups form volatile compounds other than water, and a nitrogen-containing agent such as nitrides or atomic nitrogen. Thereby the oxide atoms and hydroxyl groups bound to the glass-forming elements are replaced by nitrogen atoms. The reducing agents may be added to the glass batch prior to or during the melting process.

---

This application is a continuation-in-part of our copending application Ser. No. 603,433, filed Dec. 21, 1966, now abandoned.

The invention relates to a method of removing water from melts of inorganic glass.

In the manufacture of high grade glass it is important to keep the rate of certain undesired concomitant substances as low as possible. Such interfering substances may, for instance, be $H_2O$ or oxides of Fe and Ti which adversely affect the transmittance of the finished glass in the ultraviolet, visible and infared ranges of the spectrum. The interference by the coloring oxides can be kept under control and reduced by a proper selection of raw materials.

To control the interference of water which absorbs in the infrared range is difficult because small quantities of water are always present in the flame gases. Therefore it has been attempted to remove the water subsequently from the glass. It is known that water can be removed to a considerable extent from the molten glass by heating in vacuum or by rinsing with a dry inert gas.

The heating in vacuum takes a long time because of the relatively small diffusion coefficients of the water, particularly in large quantities of molten glass, and even then, this process does not lead to a complete dehydration but only to a temperature and pressure dependent equilibrium. Moreover, undesired vaporization of other glass components, such as alkali, is rather considerable.

Rinsing with dry inert gases involves principally the same conditions as heating in vacuum, i.e. the dehydration is not complete and the whole process is very time consuming. Also here an undesired vaporization of alkali takes place.

It is further known that glass can be dehydrated in part or entirely by melting it in carbon crucibles or by passing carbon monoxide through the molten glass. These methods utilize the water-gas equilibrium or the reaction $CO+H_2O \rightarrow CO_2+H_2$ respectively. A batch of molten glass, however, cannot be indiscriminately dehydrated by using just any kind of reducing medium, as for instance not by passing $H_2$ therethrough which comes in part in the form of $H_2O$, but only when the reducing agent reacts with the water vapor to form a volatile compound or a compound of the kind whose presence in the glass does not have the same undesired effect as water.

Further known methods of dehydrating molten glass include passing $BCl_3$ through the batch or adding to it alkali halides, alkaline earth halides or heavy metal halides, in particular fluorides.

These methods have the disadvantage that the added substances themselves or their reaction products remain in the molten glass and cannot be removed at all or only with difficulty. This is true not only of the halogens themselves but also of the cations introduced by the addition of $PbF_2$, $ZnF_2$ or $CaF_2$. Finally, there are methods for the removal of water from porous glass bodies made of glass known under the trademark "Vycor." In one of these processes the porous glass bodies are treated with $NH_3$-$N_2$ mixtures, with $NH_3$ or with its decomposition products nitrogen and hydrogen and are subsequently closely sintered in an oxidizing atmosphere. In the second process the glass bodies are impregnated with an aqueous $NH_4F$ solution and are subsequently subjected to temperatures of 800° C. to 1000° C.

Both the aforementioned methods apply to the solid and porous glass bodies sold under the trademark "Vycor" and they are therefore distinct from the method of the present invention which relates to the processing of molten glass of any desired composition. Moreover, through the $NH_3$ or $NH_4$ salts hydrogen is again introduced into the glass and acts in part with the oxides to form $H_2O$.

The present invention has as its object to eliminate water from molten glass as completely as possible without incurring the disadvantages of prior methods.

This is accomplished according to the invention in that oxygen or hydroxy groups containing glass-forming elements of the glass are reduced by agents such as C, CO, $Si_3N_4$ or atomic nitrogen, and said oxygen or hydroxy groups of the glass-forming elements are replaced by nitrogen passed into the glass melt in the form of molecular nitrogen. The oxygen or hydroxy groups containing glass ingredients react with the nitrogen to chemically bind it as well as liberate atomic nitrogen, whereby the nitrogen is activated in both forms and breaks down or replaces the hydroxy groups and thus effects dehydration. The bound nitrogen may be removed, if desired, by passing oxidizing gases through the glass melt.

It is also possible to add the reducing agents to the glass mixture prior to the melting process.

The method according to the invention is furthermore advantageously distinct from prior methods in which halides, particularly metallic halides, are added. The metal cations thereby introduced are not or only with difficulty removable from the molten glass.

Compared with the methods of melting glass in a crucible or of passing CO through the molten glass, the method of the present invention has the advantage that the removal of water is effected not only by the water-gas reaction or by the reaction $$CO+H_2O \rightarrow CO_2+H_2$$

but by the water-gas reaction and a complete substitution of nitrogen for OH. Thereby the dehydration is achieved in substantially shorter periods of time than in prior methods.

EXAMPLE 1

About one percent by weight of carbon is added to the glass batch (mixture of raw materials), taking care that the carbon does not burn up during the melting process. This can be accomplished for instance by the selection of a suitable furnace and/or by introducing a protective gas, such as carbon monoxide or inert gas like nitrogen, a noble gas, and so on. After the fusion of the mixture dry nitrogen is passed through the molten glass until the desired degree of dehydration, such as .001 weight percent $H_2O$, is reached. The length of time required to reach this stage depends on the quantity of glass, the depth of the glass charge and the amount of nitrogen used. It will average from one to several hours. So it was found that for about one pound of the glass melt four inches deep the bubbling with nitrogen must be continued for several hours. Subsequently, the free nitrogen is removed from the molten glass by passing air or oxygen therethrough. In this manner glass of any desired composition can be manufactured which contains no water detectable by conventional testing methods.

EXAMPLE 2

After the fusion of the usual glass ingredients, a mixture of nitrogen and carbon monoxide is passed through the molten glass batch. Otherwise, this process corresponds to the one of Example 1.

EXAMPLE 3

The glass mixture or the pre-molten glass is fused in nitrogen and ionized nitrogen containing gas mixtures by means of a plasma gun or an induction plasma burner.

EXAMPLE 4

To a glass batch consisting for example of 660 grams sand, 181 grams $H_3BO_3$, 265 grams $K_2CO_3$, and 54 grams $Al_2O_3$, 30 grams of pulverized pure carbon are added. This mixture including the carbon is placed in a cold furnace. The furnace should be so constructed that by introducing nitrogen the amount of oxygen therein can be substantially held down in order for the carbon not to burn up too quickly. The furnace is heated to a temperature of 1550° C. for a period of 2 to 4 hours, while nitrogen is being passed through the furnace and the molten glass so that the latter is bubbling. For this process there are required about 30 liters of $N_2$ per hour for the bubbling and a sufficient quantity of $N_2$ for the removal of $O_2$ from the furnace. The mixture is fused and concurrently dehydrated. The molten glass should be kept bubbling for at least two hours. For clearing nitrogen gas is no longer passed through the melt but only through the furnace chamber. Electrically heated furnaces are preferred in this process.

What we claim is:
1. A method of removing water from melts of inorganic glass, comprising the steps of introducing into the glass melt a reducing agent selected from the group consisting of a nitrogen-free agent with molecular nitrogen and a nitrogen-containing agent, said nitrogen-free agent comprising a substance selected from the group consisting of carbon and carbon monoxide which with the glass-forming elements carrying oxygen and hydroxyl groups form volatile compounds other than water, and said nitrogen-containing agent comprising a substance selected from the group consisting of nitrides and atomic nitrogen, whereby the oxide atoms and hydroxyl groups bound to the glass-forming elements are replaced by nitrogen atoms.

2. The method according to claim 1, in which the glass in molten and pulverized condition is blown through a nitrogen plasma burner stream.

3. The method according to claim 1, in which after the substitution of nitrogen for the oxide atoms and hydroxyl groups an oxide-containing gas is passed through the melt to replace the nitrogen with oxygen.

References Cited

UNITED STATES PATENTS

| 1,785,888 | 12/1930 | Cox et al. | 65—134 |
|---|---|---|---|
| 2,274,643 | 3/1942 | Adams | 65—30X |
| 2,331,052 | 10/1943 | Shadduck | 65—134 |
| 2,387,222 | 10/1945 | Wright | 65—32 |
| 3,287,095 | 11/1966 | Proctor | 65—134X |
| 3,305,340 | 2/1967 | Atkeson | 65—134 |
| 3,326,702 | 6/1967 | Babcock. | |

OTHER REFERENCES

Hodkin, F. W., and Cousen, A., "A Textbook of Glass Technology," D. Van Nostrand Co., New York, 1925, p. 114.

S. LEON BASHORE, Primary Examiner

J. H. HARMAN, Assistant Examiner

U.S. Cl. X.R.

65—31